May 26, 1970  C. B. PERRY ET AL  3,513,752

MOTOR

Filed Dec. 15, 1967  7 Sheets-Sheet 1

INVENTORS
CHARLES B. PERRY
KENDALL F. BONE
BY
*Norman S. Blodgett*
ATTORNEY

FLUID PRESSURE

_United States Patent Office_

3,513,752
Patented May 26, 1970

3,513,752
MOTOR
Charles B. Perry and Kendall F. Bone, Cincinnati, Ohio, assignors to The Cincinnati Milling Machine Company, Cincinnati, Ohio, a corporation
Filed Dec. 15, 1967, Ser. No. 690,948
Int. Cl. B23d 1/02
U.S. Cl. 91—35     3 Claims

ABSTRACT OF THE DISCLOSURE

The invention relates to a motor and, more particularly, to a rotary actuator using fluid as its motivating medium and indexable to any one of a plurality of angles up to plus or minus 180 degrees in response to a binary-coded digital-input or other suitable signal.

Background of the invention

The indexing of a high-inertia load presents problems that are not easily solved by the use of conventional rotary actuators. For instance, in the manufacturing system shown and described in the patent application of Perry et al., Ser. No. 690,940, filed Dec. 15, 1967 for Manufacturing System, it is proposed to attach a fixture, pallet or workpiece secured to a support in accurately-positioned relationship to a work station; then, the fixture, pallet or workpiece can be rotated through a predetermined angle and firmly locked before a work station operation is performed. Now, if the angle is a large one, the rotating mass will accumulate considerable rotational energy by the time it arrives at the stop point. This energy is difficult to dissipate quickly and the rotating mass tends to overshoot the desired angular position. Furthermore, the accumulated energy of rotation will vary with the angle, so that a stop means that operates adequately at one angle will overshoot or undershoot at another angle. These and other difficulties experienced with the prior art devices have been obviated in a novel manner by the present invention.

It is, therefore, an object of the invention to provide a motor which can be indexed to any desired angle.

A further object of this invention is the provision of a motor including a rotational energy dissipating means that operates in proportion to the angle of rotation.

A further object of the present invention is the provision of a motor operating as a rotary actuator to rotate a high-inertia load in response to a digital-input, binary-coded or other suitable signal.

It is another object of the instant invention to provide a rotary actuator having means to slow down the rotational motion before reaching a predetermined angular position, the means operating in an amount proportional to the size of the angle.

With these and other objects in view, as will be apparent to those skilled in the art, the invention resides in the combination of parts set forth in the specification and covered by the claims appended hereto.

Summary of the invention

Generally speaking, the present invention relates to a motor for indexing a correcting means associated with a work station, the motor comprising a housing having a cylindrical chamber, a vane mounted in the chamber for rotative movement about the axis of the cylinder, means for selecting a termination position to which the vane is to be rotated, and means for decelerating the vane a substantial distance from the said termination. More specifically, the means for decelerating includes a tapered leading edge on the vane cooperating with a tapered pattern of fluid release apertures on the wall of the chamber. Furthermore, the means for selecting includes a plurality of apertured disks mounted in a stack and individually mounted for rotation about a common axis for movement from a first position to a second position, the positions of the disks being selectable to control flow to and from the chamber in accordance with the binary-coded, digital-input or other suitable system of coding.

Brief description of the drawings

The character of the invention, however, may be best understood by reference to one of its structural forms, as illustrated by the accompanying drawings, in which:

FIG. 12 is a developed view of the wall of the motor chamber and FIGS. 12A, 12B and 12C represent modified nose configurations while

Description of an embodiment of the present invention

It is obvious that minor changes may be made in the form and construction of the invention without departing from the material spirit thereof. It is not, however, desired to confine the invention to the exact form herein shown and described, but it is desired to include all such as properly come within the scope claimed.

Figure 1:
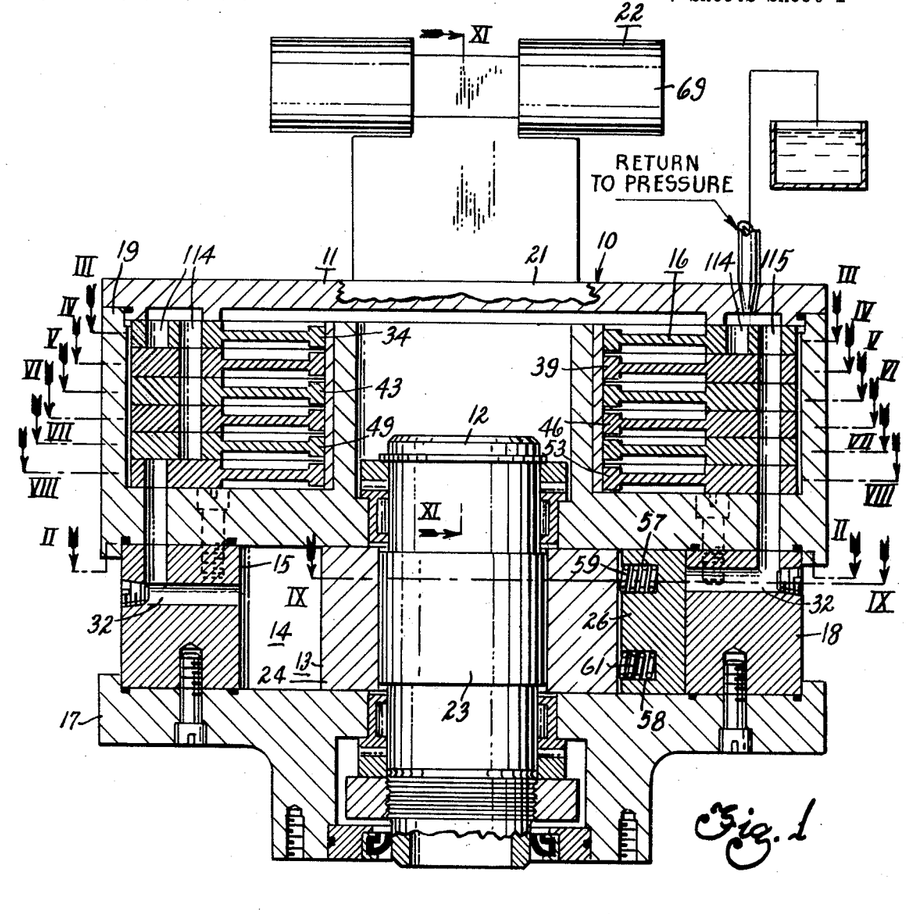
FIG. 1 is a vertical sectional view of a motor embodying the principles of the present invention.

Referring first to FIG. 1, which best shows the general features of the invention. The motor, indicated generally by the reference numeral 10, is shown as having a housing 11 in which resides a shaft 12 to which is keyed a vane 13. The housing has a chamber 14 having a cylindrical wall surface 15 along which the outer edge of the vane slides, the surface being coaxial of the shaft 12. The motor is provided with means 16 for selecting a termination position to which the vane is to be rotated; it is also provided with means for decelerating the vane a substantial distance from the said termination position.

The housing 11 is made up of a base 17 through which the shaft 12 extends, a ring-like block 18 in which the chamber 14 is formed, a control block 19 in which the means 16 is carried, and a cover 21, all fastened together in the usual way. Mounted on the upper surface of the cover is a group 22 of valves.

Figure 2:
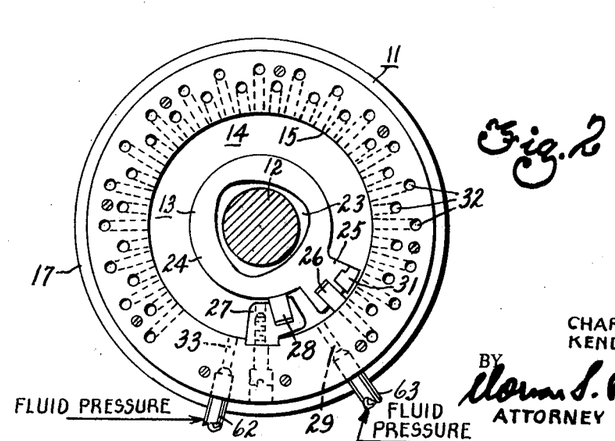
FIG. 2 is a horizontal sectional view taken on the line II—II of FIG. 1, FIGS. 3, 4, 5, 6, 7 and 8 are horizontal sectional views taken on the lines III—III, IV—IV, V—V, VI—VI, VII—VII, and VIII—VIII of FIG. 1.

Referring to FIG. 2, it can be seen that the block 18 is provided with a large number of passages 32 which open onto its upper surface. The shaft 12 is provided with an enlarged position 23 having a three-lobe polygon, involute spline or suitable torque transmission device which fits into a similar bore in the vane 13 to key them together. The vane has a hub 24 from which extends a radial wing 25. The wing has a radially-slidable spring-loaded blade 26 which presses outwardly into contact with the surface 15 of the chamber. At one side of the vane, a partition block 27 is fastened to the surface of the chamber and projects inwardly thereof. It is provided with a radially-slidable spring-loaded blade 28 which presses inwardly against the cylindrical surface of the hub 24 of the vane. A passage 29 extends through the block 18 into the chamber 14 at a position between the block 27 and the normal or "zero" position of the vane 13. The side of the vane facing away from the block 27 is provided with a nose 31 which will be described more fully hereinafter. Each of the passages 32 in the block 18 has a vertical portion that opens onto the upper surface of the block and a horizontal portion which opens on the surface 15 of the chamber 14. A passage 33 extends radially through the block at the side of the partition block 27 opposite the side on which the passage 29 is located.

Figure 3:
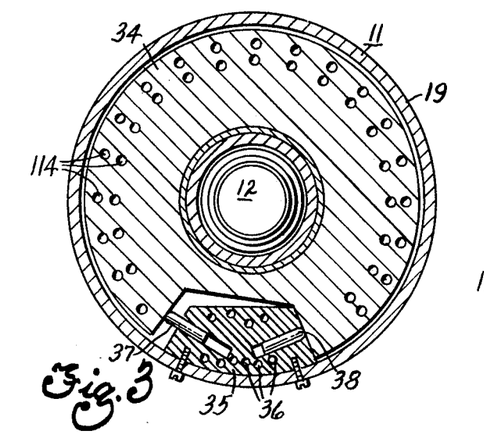
Figure 4:
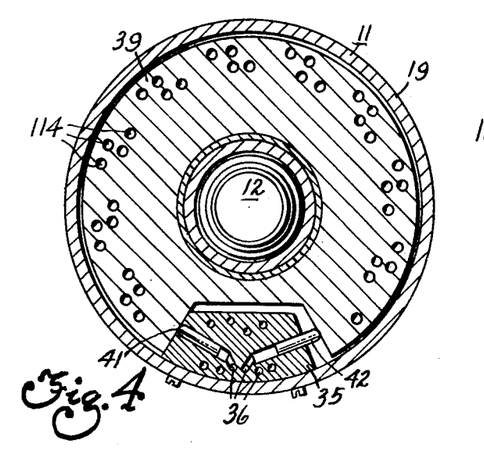
Figure 5:
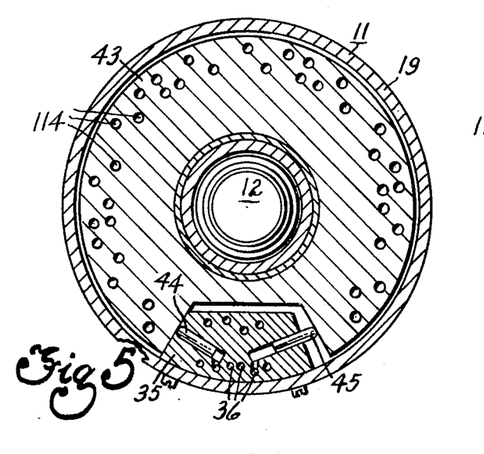
Figure 6:
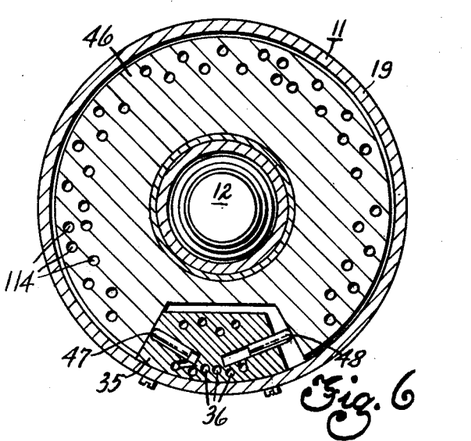
Figure 7:
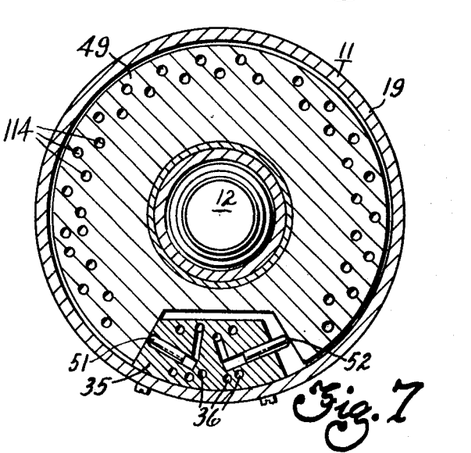
Figure 8:
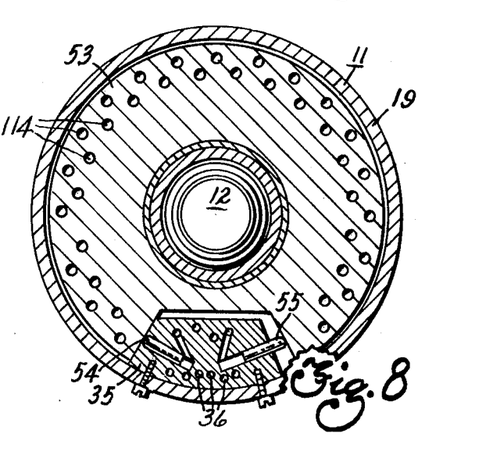

FIG. 3 shows the details of the disk 34 forming part of the control means 16 (see FIG. 1). Extending down one side of the interior of the control block 19 is a fixed pedestal 35. It is provided with a plurality of vertical passages 36 and a pair of pressure plungers 37 and 38. The pedestal is fixed in place, while one of the plungers 37 or 38 is provided with pressure fluid and the movable disk 34 is rotated about the axis of the shaft 12 to one of two positions. Referring to FIG. 4, a movable disk 39 is moved to one of two positions by the plungers 41 and 42 in the pedestal 35. Similarly, as shown in FIG. 5, a movable disk 43 is rotatable to one of two positions by plungers 44 and 55. FIG. 6 shows a disk 46 indexable by means of the plungers 47 and 48, while FIG. 7 shows a disk 49 movable about the axis of the shaft 12 by means of plungers 51 and 52 and a disk 53 is indexed by plungers 54 and 55. Each of the passages 36 is connected to a particular bore occupied by one of the plungers 37, 38, 41, 42, 44, 45, 47, 48, 51, 52, 54 or 55.

Figures 9, 10:
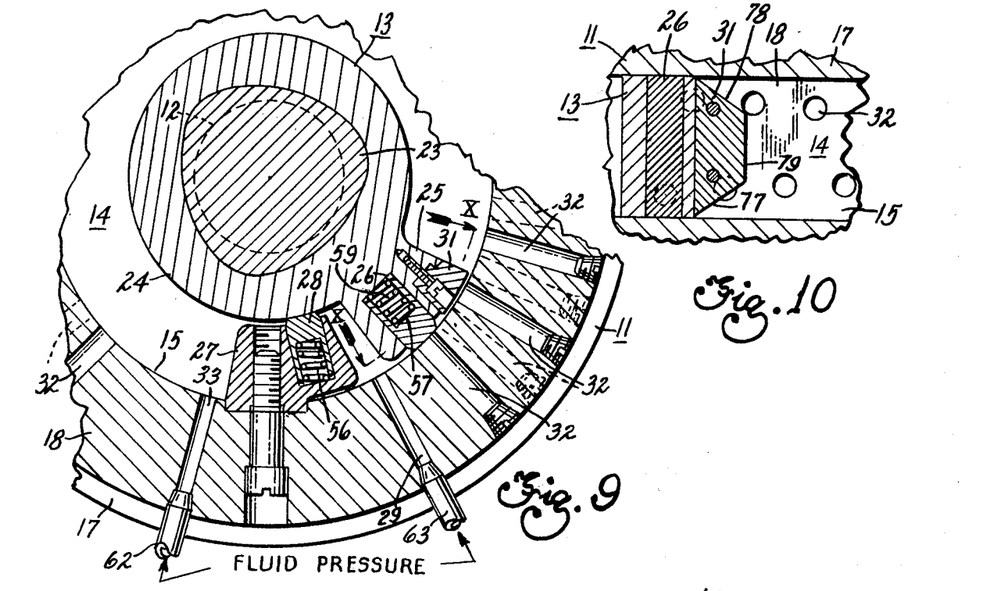
FIG. 9 is a horizontal sectional view of the motor taken on the line IX—IX of FIG. 1.
FIG. 10 is a vertical sectional view taken on the line X—X of FIG. 9.

FIG. 9 shows particularly well the details of construction of the vane 13 and related equipment. The blade 28 of the block 27 is provided with bore-forming means at its inner end in which resides coil spring means 56 pressing against the bottom of the recess in which the blade resides; two such bores and springs are provided in vertically-spaced positions. Similarly, two bores 57 and 58 are provided on the inner side of the blade 26 of the vane; coil springs 59 and 61 reside in the bores 57 and 58, respectively, and press the blade outwardly into contact with the surface 15 of the chamber. The passage 33 is connected by a conduit 62 to a source of fluid pressure, not shown, while the passage 29 is similarly connected to the said source by a conduit 63.

FIG. 10 is a sectional view through the end of the vane 13. The blade 26 is generally rectangular in shape, but the nose 31 has a varying cross-section. Such varying cross-section can be a trapezoid the base of which is vertical and the inclined sides of which extend inwardly and to the right, so that the short base of the trapezoid leads the vane, as the vane rotates, away from the block 27 (counterclockwise in FIG. 9).

Figure 11:
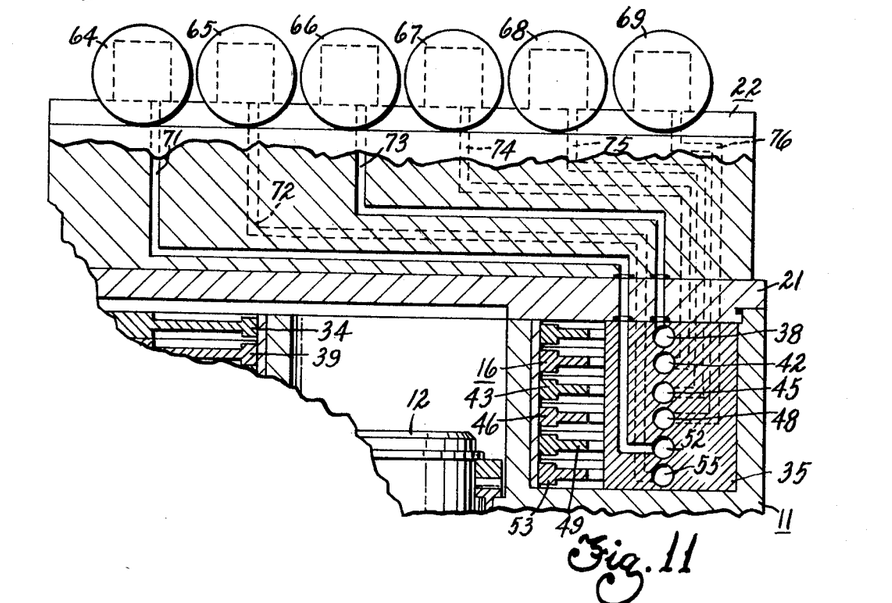
FIG. 11 is a somewhat schematic vertical sectional view of the invention taken on the line XI—XI of FIG. 1.

FIG. 11 is a vertical sectional view through the motor showing the manner in which pressure fluid is introduced into the pedestal 35 to operate the plungers. The type of coding and the number of orifices or angles to which the motor is to be directed will determine the number of disks to be used. As an example, the division of 360 degrees into five degree increments is shown therein with six disks though other values such as one degree increments with eight disks also would be in accordance with the teaching of the present invention. It is to be understood that a general formulation of two (2) to the "$n$"th power is applicable where the value of two (2) to the $n$th power is greater than the number of ports controlled where using binary coding. Other formulations are applicable if other than binary coding is used. Thus, in the example given, there are six disks 34, 39, 43, 46, 49 and 53 to be rotated and, so, six four-way valves 64, 65, 66, 67, 68 and 69 are provided, each valve being associated with a corresponding disk. A passage 71 leads from the valve 64 to bore containing the plunger 52 to operate the disk 49. A passage 72 leads from the valve 65 to the plunger 55 associated with the disk 53. Similarly, passages 73, 74, 75 and 76 lead from the valves 66, 67, 68 and 69 to the plungers 38, 42, 45 and 48, associated with the disks 34, 39, 43 and 46 to move them to their "first" position. In each case, a passage (not shown) leads from the other side of the particular valve to the other plunger of each set to rotate the particular disk to its "second" position.

Figure 12:
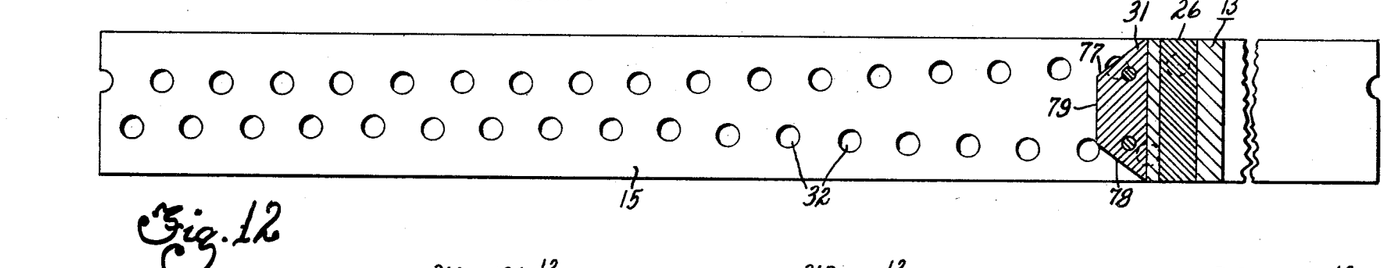

FIG. 12 shows how the passages 32 open onto the surface 15 of the chamber in a particular pattern. The further the location of a particular opening from the block 27 (in the counterclockwise direction in FIG. 2), the closer to the centerline of the surface is the opening. The opening which is closest to the block is located so that, when the nose 31 as a partial restrictor passes in proximity to the opening or port, the latter is partly clsed off by one of the inclined sides 77 or 78 only. The opening farthest away from the block in the direction of rotation of the vane is located so that only the vertical leading edge 79 of the nose 31 passes over it. The openings between these extreme positions are located so as to be subjected partly to one of the inclined sides 77 and 78 and partly to the leading edge 79. Thus the leading edge provides preliminary slowing until vane 26 substantially closes the port. When the vane 26 substantially closes the port, restrictive effect of nose 31 is minimal by virture of the small leakage permitted by vane 26. The overall result is that nose 31 provides for slow down whereas vane 26 establishes final angular position due to accurate seeking of location as to the opening or port.

Figure 12A:
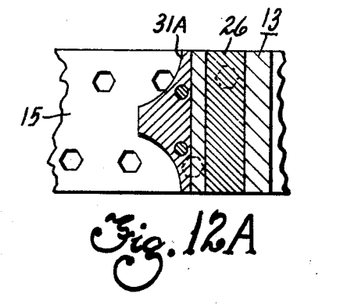
Figure 12B:
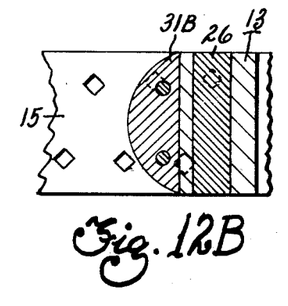
Figure 12C:
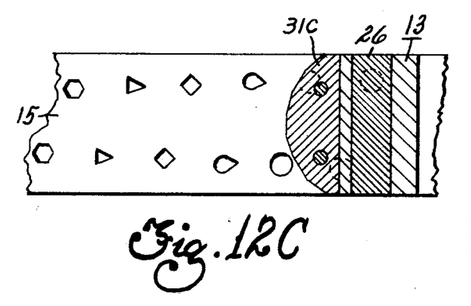
Figure 12D:
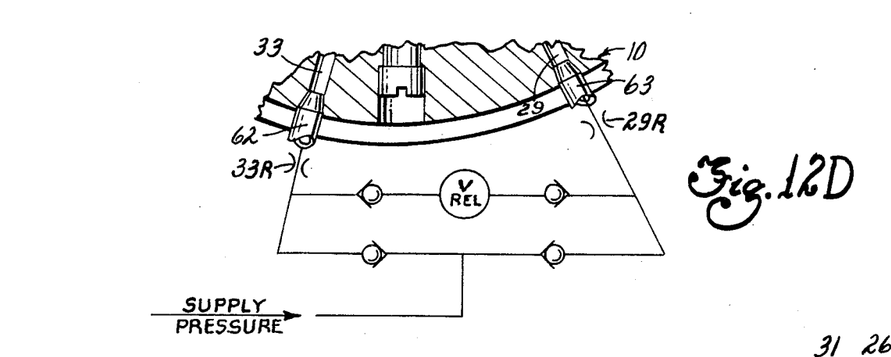
FIG. 12D shows a hydraulic power circuit.

Similarly, in place of trapezoidal configuration, other mathematically definable or irregular profiles of nose configuration could be used to achieve any variation in anticipation as a function of angular index. FIGS. 12A, 12B, and 12C are fragmentary representations of such modification of nose configurations 31A, 31B and 31C, respectively. FIG. 12D shows diagrammatically a portion of the paddle motor 10 with a pair of openings 33 and 29 for example each equipped with restrictor means 33R and 29R, respectively. Suitable conduits or passage forming means interconnect with centrally located "relief valve" serially connected with check valves as shown. A trunk or passage parallel in connected location to the relief and check valves just noted, includes additional oppositely disposed check valves on either side of a pressure supply conduct or passage as indicated. Clearly then, fluid displaced from the paddle motor 10 passing through restrictors 33R or 29R must by virtue of closure of the trunk line check valves, pass through one or the other of the check valves associated with the relief valve. Only when pressure rises above setting or value of relief valve pressure can fluid medium pass through the check valve and associated relief valve to tank, sump or supply. Thus the pressure setting or value of the relief valve will affect the maximum fluid pressure in the paddle motor 10 and thus maximum deceleration capability of the paddle motor 10.

Figure 13:
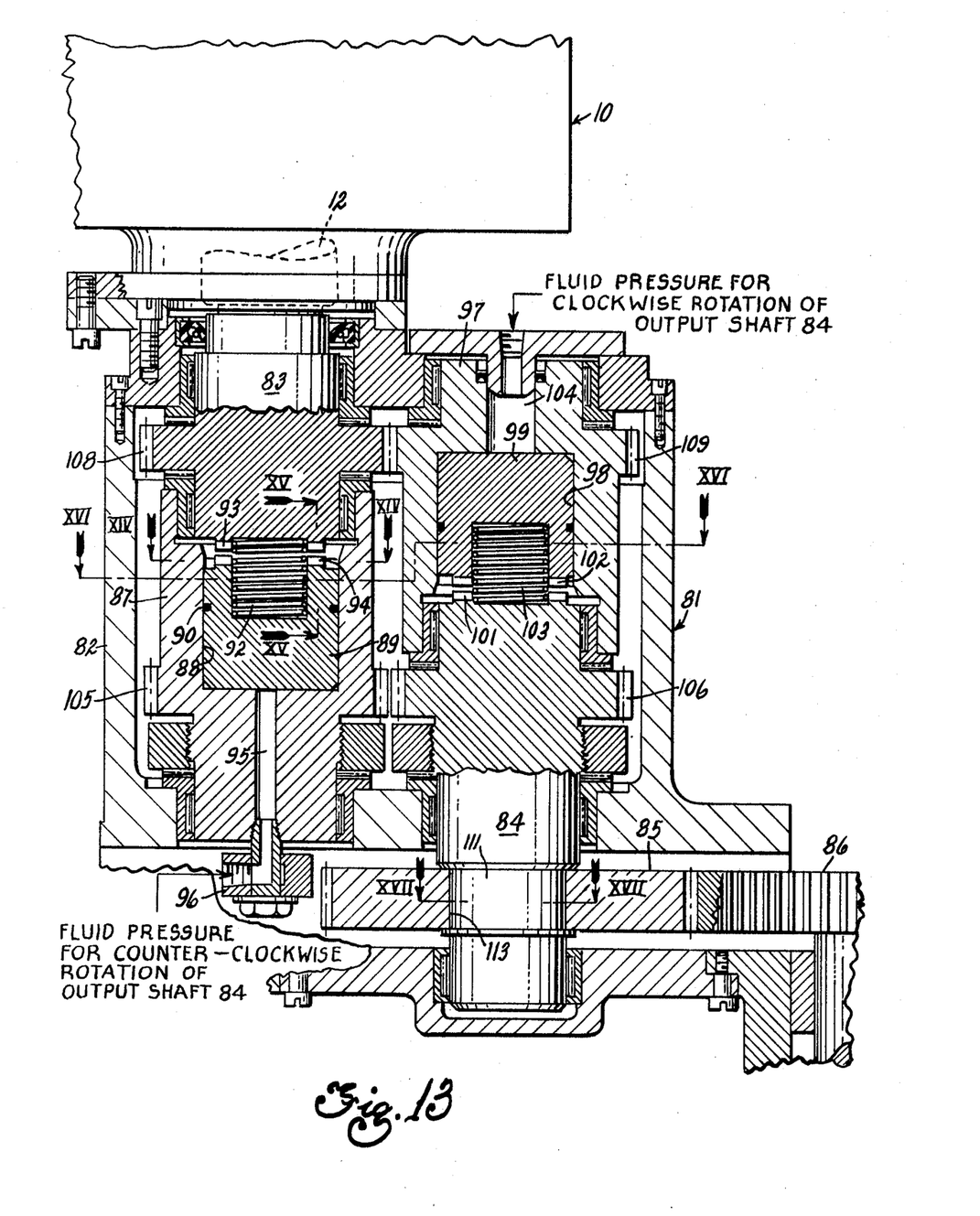
FIG. 13 is a vertical sectional view of a transmission forming part of the invention.

FIG. 13 shows a transmission 81 for use with the motor 10 described above. A housing 82 carries a rotatable input shaft 83 which has one end extending from the housing for connection to the shaft 12 of the motor 10. An output shaft 84 is also rotatably mounted in the housing and has one end extending therefrom for holding a gear 85. This gear, in turn, is adapted to engage a gear 86 forming part of the connector shown and described in the patent application of Perry et al., Ser. No. 690,941, filed Dec. 15, 1967 for Manufacturing System. The output shaft 84 is suitably mounted in bearings in spaced, parallel relationship to the input shaft 83. A reverse shaft 87 is mounted in the housing coaxially of the input shaft for rotation independently thereof. This reverse shaft is provided at the end adjacent the input shaft 83 with a bore 88 in which resides a piston 89. This piston is axially slidable in the bore, but is prevented by a three-lobes polygon surface 91 (see FIG. 14) from rotating relative to the reverse shaft. A rubber O-ring 90 extends around the piston to form a sliding seal with the wall of the bore. A coil spring 92 extends between the piston 89 and the input shaft to hold them normally apart. The inner end of the input shaft is provided with projections 93 and the adjacent end of the piston 89 is provided with complementary projections 94, the two sets of projections being arranged to engage when the piston is moved toward the shaft. In order to provide for such movement of the piston, a passage 95 extends axially of the reverse shaft and opens on the bottom of the bore 88; at the lower end, the passage is connected through a commutating fitting 96 to a source of pressure fluid, not shown.

A forward shaft 97 is mounted in the shaft coaxially of the output shaft 84 for rotation independently of the shaft and having a bore 98 in the end facing the shaft. A piston 99 is nonrotatably mounted in the bore for axial sliding only. Complementary sets of projections 101 and 102 are formed on the adjacent ends of the forward shaft 84 and the piston 99, respectively, and a spring 103 maintains them apart. To bring them together, a pressure fluid passage 104 extends axially through the forward shaft into the bottom of the bore 98 and is connected to a fluid source, not shown.

Gear teeth 105 are formed on the reverse shaft 87, while similar gear teeth 106 are formed on the output shaft 84. These gear teeth are on the same horizontal level and are jointed by an idler gear 107 (see FIG. 16). Gear teeth 108 on the input shaft 83 mesh with gear teeth 109 formed on the forward shaft 97.

Figures 14, 15:
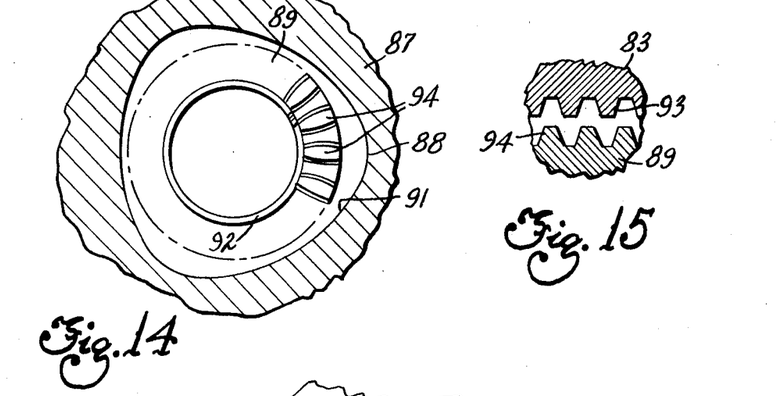
FIG. 14 is a horizontal sectional view taken on the line XIV—XIV of FIG. 13.
FIG. 15 is a vertical sectional view of the transmission taken on the line XV—XV of FIG. 13.

FIG. 14 shows the manner in which the projections 94 on the piston 89 are constructed. The projections may be formed as gear teeth of a generally radial, rhombic or lozenge-shaped configuration (as observed from the ends of a tooth). The flanks are convex, while the corresponding complementary projections 93 on the input shaft 83 are gear teeth with concave flanks that will mate with the projections 94 in the manner shown and described in the patent of Wildhaber, Pat. No. 2,384,582, for example. FIG. 15 shows the cross-sectional shapes of the projections as being that of gear teeth.

Figures 16, 17:
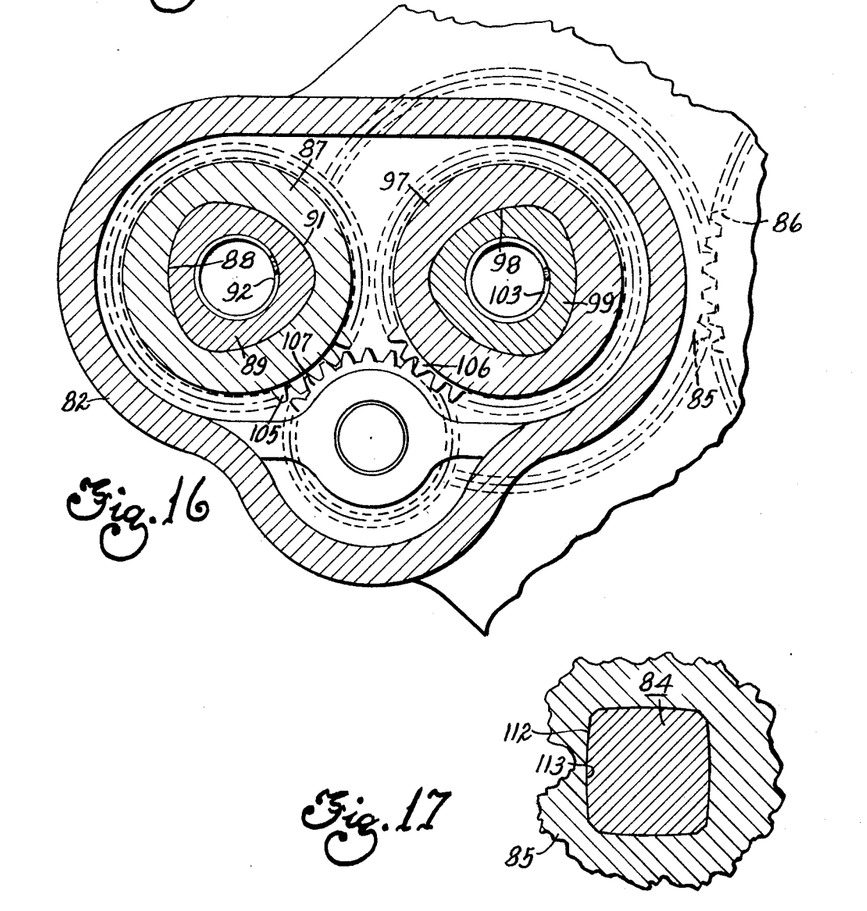
FIG. 16 is a horizontal sectional view taken on the line XVI—XVI of FIG. 13.
FIG. 17 is a horizontal sectional view of the invention taken on the line XVII—XVII of FIG. 13.

FIG. 16 shows the manner in which the idler gear 107 is rotatably mounted in the housing 82 to mesh with both the gear teeth 105 on the reverse shaft 87 and the gear teeth 106 on the output shaft 84.

As is evident in FIG. 17, the output shaft 84 is provided with a reduced lower portion 111 formed with a four-lobed polygon surface 112 (key or spline also possible since no fluid pressure seal is needed) which fits tightly into a correspondingly-shaped bore 113 formed in the gear 85.

Figures 18, 19, 20, 21:
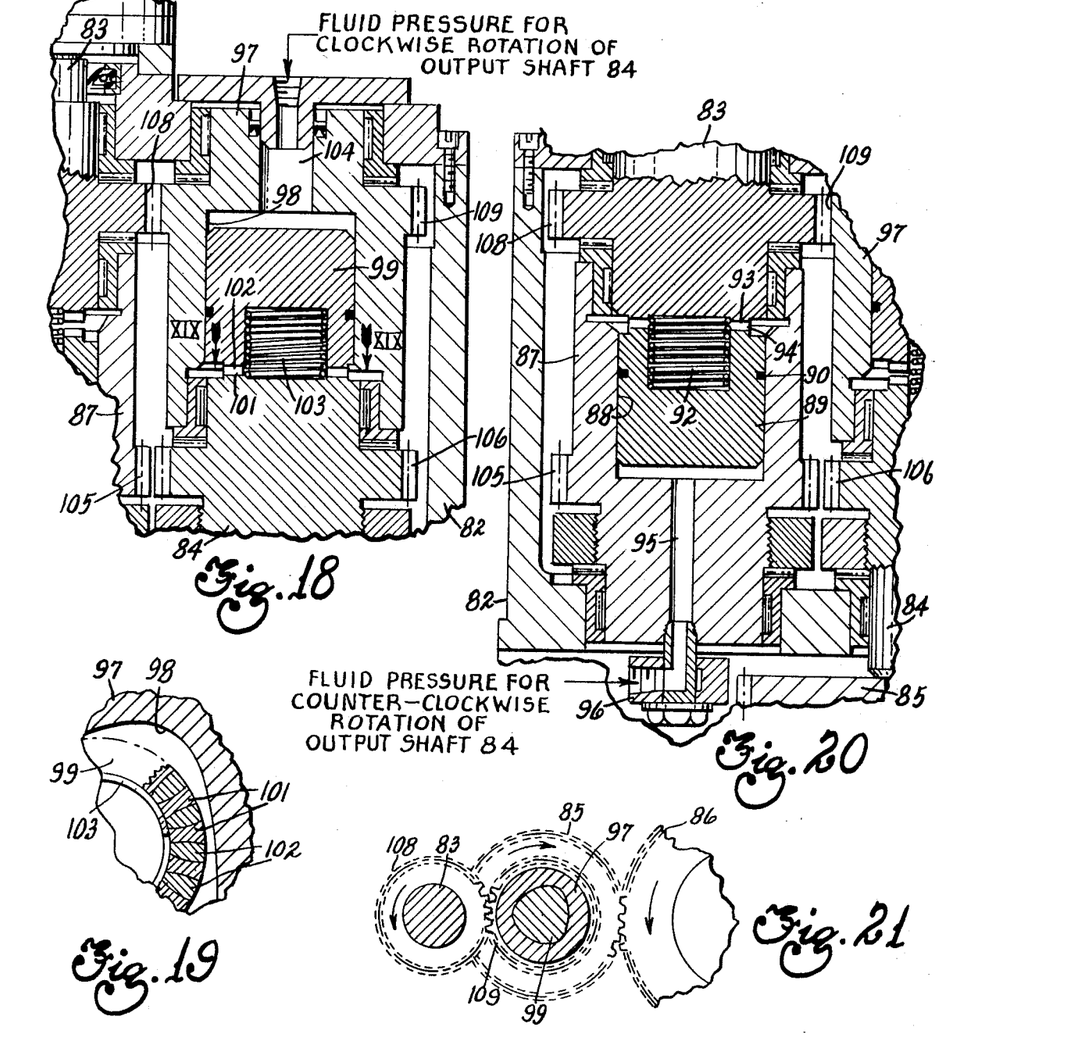
FIG. 18 is a vertical sectional view of a portion of the transmission in forward condition.
FIG. 19 is a horizontal sectional view of the invention taken on the line XIX—XIX of FIG. 18.
FIG. 20 is a vertical sectional view of another portion of the transmission in reverse condition.
FIG. 21 shows the gear train motion in forward condition.

FIG. 18 shows the condition of the apparatus when the piston 99 has been pressed downwardly by fluid pressure so that the projections 101 and 102 mesh and join the forward shaft 97 and this piston 99 on the one hand into driving relationship with the output shaft 84 on the other hand. The nature of the meshing of the projections in this condition is shown in FIG. 19. FIG. 20 shows the condition that exists in the transmission when the piston 89 is pressed upwardly by pressure fluid into engagement with the input shaft 83, so that projections 93 and 94 mesh. In this condition the input shaft 83 is connected in driving relationship to the piston 89 and, therefore, to the reverse shaft 87.

As demonstrated in FIG. 21, when pressure fluid is supplied to the piston 99 (and not to the piston 89), as demonstrated in FIG. 18, the counter-clockwise rotation of the shaft 12 of the motor 10 produces a similar rotation of the input shaft 83 which drives through the gear teeth 108 and 109 to rotate the forward shaft 97 in the clockwise direction. This operates through the piston 99 and the output shaft 84 to rotate the gear 86 in the counter-clockwise direction.

Figure 22:
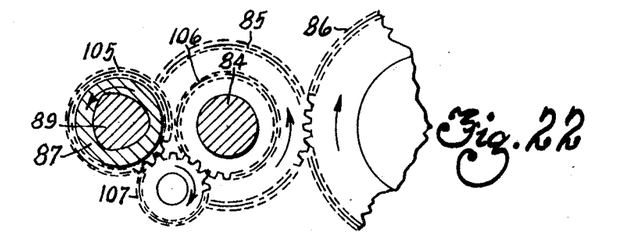
FIG. 22 shows the gear train motion in reverse condition.

FIG. 22 shows how counter-clockwise rotation of the motor 10 (when the fluid pressure operates on the piston 89, as in FIG. 20) causes similar rotation of the input shaft 83. This operates through the piston 89 to rotate the reverse shaft 87 in the counter-clockwise direction. The shaft 87 rotates the idler gear 107 in the clockwise manner, which, in turn, rotates the output shaft 84 in the counter-clockwise direction. This rotates the gear 86 with clockwise rotation.

The operation of the apparatus will now be readily understood in view of the above description. First of all a suitable signal (mechanical fluid pressure or solenoid electrical signal) is presented to the valves 64, 65, 66, 67, 68 and 69; this signal is binary in nature in the illustrated embodiment and consists of six signals, each of which indicates either a "first" or a "second" condition to each valve. The valves having been conditioned in this manner, they cause fluid pressure to be presented to one or the other of the pairs of plungers 37–38, 41–42, 44–45, 47–48, 51–52, and 54–55. This in turn results in the indexing of each of the disks 34, 39, 43, 46, 49 and 53 to one of two positions, so that a distinctive binary number is represented by the conditions of the six disks. Now, a pattern of apertures 114 is provided in each disk, such that, when the aforementioned binary number is represented by the condition of the disks, a complete vertical passage 115 through the entire stack of disks is provided at one and only one location by the coincidence of apertures 114 at that location. This passage is shown in FIG. 1 as being connected to that location. This passage is shown in FIG. 1 as being connected to zero pressure. Now, pressure fluid is continuously introduced into the chamber 14 through the passages 33 and 29. This fluid pressure, therefore, acts on both sides of the wing 25 of the vane 13 and would otherwise result in no motion of the vane. However, the pressurized fluid entering the chamber through the passage 33 leaves the chamber through a passage 32 in the wall of the chamber and through the disk passage 115. This means that less pressure exists on this side of the vane than on the side served by the passage 29. The vane, therefore, moves counter-clockwise and carries the shaft 12 with it. If fluid pressure is brought to bear on the piston 99 through the passage 104, this counter-clockwise motion will be transferred to the input shaft 83 of the transmission and will result in similar counter-clockwise motion in the gear 86 forming part of the connector. If, on the other hand, fluid pressure is brought to bear on the piston 89, the gear 86 will be rotated clockwise.

Now, the binary member represented by the signal impressed on the valves 22 and by the condition of the stack of disks also represents a pre-selected horizontal angle to which the vane 13 is to be rotated. This angle is associated with an accurately-located passage 32 opening onto the surface 15 of the chamber 14. It is this particular opening (and no other) through which the pressure fluid from the passage 33 escapes during the movement of the vane. In the embodiment shown, these openings are placed 5 degrees apart and normally are used up to 180 degrees. Angles of location of the gear 86 over 180 degrees from the "zero" position are brought about by use of the reversing function of the transmission 81.

As the vane rotates, the leading edge of the nose 31 passes successively over the various openings 32 until it approaches the opening through which the fluid from the passage 33 is escaping. When the nose has passed through restrictive proximity to a particular opening and the vane becomes centered over a port or opening, there is then no passage for the escape of the fluid and the pressure on both sides of the vane will be equal. The vane will then come to a complete stop at an angle related to the position of the opening subject to effect of the hydraulic power circuitry represented in FIG. 12D. Now, if the opening is located a smaller distance from the edging of the surface 15, it will be restricted relatively late during movement due to one of the inclined edges 77 and 78 of the nose in proximity to the opening and the deceleration may also be modified by clearance changes between the nose 31 and surface 15. On the other hand, if the opening is located further away from edging of the surface, it will be abruptly closed by the vertical edge 79 and deceleration will be appreciably more abrupt also. Deceleration rate also is capable of modification by clearance changes between the nose 31 and surface 15. Thus, the openings further away from the surface edging are closed earlier to permit greater length of time to dissipate energy for large angle indexes. Openings that are located at intermediate positions will be closed partly by an inclined edge and partly by a vertical edge, so that the deceleration rate will be at an intermediate value, as is true also of the anticipation. As is evident in FIG. 12, the further the vane has moved from its zero position, the faster it will be progressing when it arrives at the preselected angle and opening. For that reason, the openings are located closer and closer to each other or further away from opposite edging of the surface 15 as one progresses from the zero position to the largest angle.

It is noted that the openings or ports through the member having surface 15 are within the scope of this invention for other than circular shape. Thus elliptical, diamond, hexagonal or other irregular shaped openings or ports are also usable with positioning at differing distances from the edging. Also the ports or openings in a particular unit may be mixed in type as to shape of the opening yet at differing distances from the edging.

The invention having been thus described, what is claimed as new and desired to secure by Letters Patent is:

What is claimed is:
1. Motor for indexing a connecting means associated with a work station, comprising:
   (a) a housing having a cylindrical chamber,
   (b) a vane mounted in the chamber for rotative movement about the axis of the cylinder,
   (c) means for selecting a termination position to which the vane is to be rotated, and
   (d) means for decelerating the vane a substantial distance from the said termination position, including a tapered leading edge on the vane cooperating with a tapered pattern of fluid release apertures on the wall of the chamber.

2. Motor for indexing a connecting means associated with a work station, comprising:
   (a) a housing having a cylindrical chamber,
   (b) a vane mounted in the chamber for rotative movement about the axis of the cylinder,
   (c) means for selecting a termination position to which the vane is to be rotated, including a plurality of apertured discs mounted in a stack and individually mounted for rotation about a common axis for movement from a first position to a second position, the positions of the discs being selectable to control flow of fluid to and from the chamber in accordance with a predetermined system of coding, and
   (d) means for decelerating the vane a substantial distance from the said termination position.

3. Motor as recited in claim 2, wherein the means for decelerating includes a leading edge on the vane cooperating with at least two fluid release apertures on the wall of the chamber, wherein each aperture is provided with a restrictor, wherein the exterior ends of the restrictors are joined by a pressure relief valve having a check valve on each side directed to open toward the valve, and wherein a fluid supply line is connected to the exterior ends of the restrictors through check valves which are directed to open toward the restrictors.

References Cited

UNITED STATES PATENTS

| 2,842,975 | 7/1958 | Meyer et al. | 74—361 |
| 2,953,942 | 9/1960 | Schwartz et al. | 74—361 XR |
| 3,156,157 | 11/1964 | Smith et al. | 91—357 XR |
| 3,225,660 | 12/1965 | Stange | 91—357 XR |
| 3,246,572 | 4/1966 | Ogilvie | 91—402 XR |
| 3,411,413 | 11/1968 | MacNeill et al. | 91—357 |

LAURENCE M. GOODRIDGE, Primary Examiner

U.S. Cl. X.R.

91—357